United States Patent Office 2,990,403
Patented June 27, 1961

2,990,403
PREPARATION OF AMINOALKYL α-SUBSTITUTED ACRYLATES
Nicholas T. Gehshan, Southampton, and Edward H. Specht, Huntingdon Valley, Pa., assignors to Rohm & Haas Company, Philadelphia, Pa., a corporation of Delaware
No Drawing. Filed Mar. 19, 1959, Ser. No. 800,368
9 Claims. (Cl. 260—247.2.)

This invention concerns a process for preparing tertiary aminoalkyl methacrylates and other α-substituted acrylates, such as α-phenylacrylates, α-butylacrylates, α-decylacrylates, and α-benzylacrylates. It deals with a process wherein esters of a tertiary aminoalkanol and an α-substituted acrylic acid are prepared by (1) reacting an organic carboxylic acid, nickel carbonyl, and a mono-substituted acetylene at a reacting temperature between 65° and 125° C., (2) supplying an aminoalkanol to this reacting mixture and reacting it with said acid, nickel carbonyl, and said acetylene, (3) supplying carbon monoxide to the reacting mixture, and (4) continuing reaction by bringing into the reacting mixture between 65° C. and 125° C. nickel carbonyl, an organic carboxylic acid or hydrochloric acid, the tertiary aminoalkanol, the substituted acetylene, and carbon monoxide.

It has previously been proposed to react together alkanols, nickel carbonyl, an acid such as hydrochloric acid, and acetylene to form alkyl acrylates. It was also found that the reaction of an alkanol, carbon monoxide, and acetylene could be imposed upon the reaction of the four above starting materials.

When it was attempted to carry out comparable reactions with various alcohols and mono-substituted acetylenes in place of acetylene itself, difficulties were at once encountered. It was suggested that the reluctance of the substituted acetylenes to react could be overcome by raising the temperature of reaction. With some alcohols this has been found helpful in bringing about reaction of the alcohol, nickel carbonyl, acid, and substituted acetylene. With other alcohols the four component reaction did not succeed and, in such instances, it was completely impossible to impose the reaction of alcohol, carbon monoxide, and substituted acetylene thereupon. Furthermore, this latter reaction is not always successfully imposed upon an operating reaction of the four starting materials, even when the four component reaction can be effected.

One type of alcohol which it is particularly desired to utilize comprises tertiary aminoalkanols. When such an alcohol is mixed with nickel carbonyl, an acid, and a substituted acetylene, it is found very difficult to obtain or maintain the desired reaction to form an α-substituted acrylic ester of the aminoalkanol. Thus, it becomes impractical to establish the reaction of said aminoalkanol, nickel carbonyl, acid, carbon monoxide, and substituted acetylene. Yet a way has now been discovered which makes this last reaction practical and effective.

Reaction is first established with a monocarboxylic acid, especially an acrylic acid, nickel carbonyl, and acetylene or the α-substituted acetylene. This is best accomplished in the presence of an inert organic solvent, such as a volatile solvent naphtha, benzene, toluene, xylene, methyl ethyl ketone, or a dimethyl or diethyl ether of an ethylene glycol, or a mixture of such solvents. Usually solvent, acid, and nickel carbonyl are mixed under an inert atmosphere, such as nitrogen, and the substituted acetylene added, but other orders of bringing these reactants together are likewise effective. For example, solvent may be placed in a reaction vessel and the reactants introduced in any order or simultaneously.

The mixture is heated to a reacting temperature, which may vary from about 65° to 125° C. which range may also be applied to subsequent stages of reaction. A preferred temperature range is 75° to 115° C. both for the initial reaction and for the subsequent stages of reaction. The temperature may be controlled by the rates of bringing reactants together and/or by heating and/or cooling, as needed.

When the initial reaction is proceeding, as may be noted from development of color, heat or reaction, or absorption of reactants, there is supplied the desired tertiary aminoalkanol or carbon monoxide or both the tertiary aminoalkanol and carbon monoxide. The order in which these additional reactants are supplied is not critical, but rather a matter of convenience. If one is first introduced, the other may be supplied thereafter.

There are then brought into the reacting mixture in operating proportions aminoalkanol, nickel carbonyl, acid (which may now be an organic acid such as acetic, propionic, or an acrylic acid or hydrochloric acid), substituted acetylene, and carbon monoxide. Solvent may also be supplied continuously or intermittently as required to maintain the reaction mixture in a fluid and mobile state.

The reaction may be carried out batchwise or continuously. In the latter case, reaction mixture is taken off as reaction proceeds. If nickel carbonyl remains in the batch or the effluent, this is desirably consumed by reacting it with aminoalkanol, acid, and substituted acetylene, one or both of these being passed into the batch or effluent as needed to complete the reaction with nickel carbonyl.

The reaction mixture is now ready for isolation of the desired α-substituted acrylic ester. In most cases, this can be accomplished by distilling off the solvent and recovering the desired ester by distillation under reduced pressure.

The residue should be worked up to recover the nickel salt and, if a nickel acrylate is also present, to recover the acrylic acid therefrom as well as the nickel. A nickel acrylate may be treated with a strong inorganic acid to form free acid and nickel salt from the strong acid and the free acrylic acid is distilled from the mixture. In some cases extraction methods may also be used to aid in the recovery of product.

Useful tertiary aminoalkanols may be defined by the formula

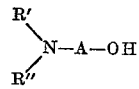

wherein A represents an alkylene group, preferably of two to three carbon atoms, R' and R", when taken individually, represent alkyl, cycloalkyl, aralkyl, or aryl groups preferably of not over 12 carbon atoms each, or when taken together, represent a saturated divalent aliphatic chain of four to five atoms as in

—CH$_2$CH$_2$CH$_2$CH$_2$—
—CH$_2$CH$_2$CH$_2$CH$_2$CH$_2$— and —CH$_2$CH$_2$OCH$_2$CH$_2$—, and alkylated, especially methylated, chains of this sort, typical of which are found in 2-methylpiperidine, 2- or 3-methylmorpholine, or 3-methyl-2-phenylmorpholine.

Typical aminoalkanols include 2-N,N-dimethylaminoethanol, 2- or 3-N,N-dimethylaminopropanol, N,N-diethylaminoethanol, N,N-diethylanimopropanols, N,N-di-n-butylaminoethanol, N,N-isobutylaminoethanol, N,N-di-sec-butylaminoethanol, and similar propanols, N-alkyl groups up to four carbon atoms being preferred without, however, limitation thereto, N,N-dihexylaminoethanol, N,N-dioctylaminoethanol, N-dodecyl - N - methylaminoethanol, N-benzyl-N-methylaminoethanol, N - phenyl-N-methylaminoethanol, N-phenyl-N-methylaminopropanols, N,N - dibenzylaminoethanol, N,N - dicyclohexylaminoethanol, morpholinoethanol, morpholinopropanols, pyrrolidinoethanol, or piperidinoethanol and the obvious comparable 2-propanol or 3-propanol derivatives. A somewhat similar aminoalkanol is 2-(2-pyridyl)ethanol, which can be used in the same way as any of the above tertiary aminoalkanols.

It was discovered that when there is used at the start an acrylic acid, reaction of this acid with nickel carbonyl and substituted acetylene can be started between 65° and 125° C. In this reaction there is apparently formed a catalyst which permits continuing reaction with aminoalkanol and carbon monoxide.

It is generally desirable to use the acrylic acid corresponding to the α-substituted acrylate which it is desired to prepare by the process of this invention. In such a procedure there is no contamination from a different acrylic acid or its ester. Since, however, various substituted acrylic acids may not be available, it is important to note that the initial stage of reaction can be effected with an acrylic acid other than that which corresponds to the acid group derivable from the substituted acetylene. Thus, readily available acrylic or methacrylic acid may be used for the initial stage even though the acrylate developed is an ester of an α-substituted acrylic acid such as an aminoalkyl α-ethylacrylate, α-butylacrylate, α-decylacrylate, α-benzylacrylate, or α-phenylacrylate. After reaction has been started, there can be supplied hydrochloric acid and the reaction of mono-substituted acetylene, nickel carbonyl, acid, a carbon monoxide, and aminoalcohol continued thus without further use of an acrylic acid. The presence of some extraneous ester of acrylic acide in the first runnings is not very serious, particularly if the process is run in a continuous manner.

The expression "an acrylic acid" is meant to apply to any of the α,β-unsaturated monocarboxylic acids having a terminal vinylidene group.

Typical acrylic acids include acrylic, α-methacrylic, α-ethacrylic, α-butacrylic, α-amylacrylic, α-hexacrylic, α-octacrylic, α-decylacrylic, α-cyclopentylacrylic, α-cyclohexylacrylic, α-phenylacrylic, α-p-methylphenylacrylic, α-benzylacrylic acids. These may be summarized by the structure

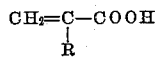

where R is an alkyl, cycloalkyl, aralkyl, or phenyl gorup.

The first stage of reaction of carboxylic acid, nickel carbonyl, and acetylene or mono-substituted acetylene yields a carboxylic anhydride, which can be later reacted with the aminoalcohol. It is possible, but less desirable, to initiate reaction with a simple carboxylic acid other than an acrylic acid, such as acetic or propionic. This would, however, introduce at the start a small amount of an impurity which does not behave like an acrylate.

As substituted acetylenes, there may be used an alkylacetylene, a benzylacetylene, a phenylacetylene, including the alkylphenylacetylenes, or a cycloalkylacetylene. Methylacetylene, butylacetylene, 1-heptyne, 1-dodecyne, tolyacetylene, or cyclohexylacetylene are typical specific examples.

In the initial stage of reacting a carboxylic acid, nickel carbonyl, and an acetylene, there may be a large excess of acid, or of acid and nickel carbonyl compared to the acetylene. At this stage, proportions are not especially significant or critical.

After a reaction has been initiated and reaction is then started with an aminoalcohol and carbon monoxide, it is necessary, if the process is to be maintained, to observe some proportions.

The most important of these is the ratio of carbon monoxide to the total available carbonyl. The percentage of the total carbonyl supplied by the carbon monoxide should not exceed 70% for stable and continuous reaction. There is no fixed lower limit but from economic considerations the percentage of carbon monoxide should be at least 30%, and the preferred percentage is 35% to 65%.

The acid supplied should be in general about proportional to the nickel carbonyl within about 25% of equivalency. It is often preferred to operate the continuous process with a 5% to 20% (by moles) deficiency of acid based on the nickel carbonyl being supplied. Again, there are situations in which an excess from 1% to 10% of acid will be preferred. The latter situation may be preferred when an organic acid is supplied and the former, when hydrochloric acid or hydrogen chloride is used.

The ratio between moles of substituted acetylene and moles of total carbonyl (CO) should ideally be 1:1, but it may be conveniently varied either way from the ideal by 20% or even more without upsetting the continuous reaction. It seems better to supply the substituted acetylene in excess than in deficiency and excesses up to 50% have been found to provide smooth operation, even if it then became desirable to recover and/or recycle the acetylene.

The aminoalcohol should ideally be about equivalent to the total available carbonyl from both carbon monoxide and nickel carbonyl which reacts with acid. This proportion may, however, be varied from the ideal by at least 10%.

Further details of procedure will be found in the illustrative examples which follow. Parts are by weight unless otherwise designated.

*Example 1*

The reactor was swept with nitrogen and charged with 200 cc. (173 g.) of toluene and 42.5 cc. (43.0 g., 0.5 m.) of methacrylic acid. The nickel carbonyl feeder was charged with a solution of 99 cc. (128 g., 0.75 m.) of nickel carbonyl and 351 cc. (304 g.) of toluene.

The stirrer was started and methylacetylene was fed at the rate of 1.05 m./hr. (42 g./hr.), methacrylic acid at 0.5 m./hr. (43 g./hr., 42.5 cc./hr.), and the nickel carbonyl solution at 3 cc./min. The stoichiometric reaction of these materials was started after 10 minutes by heating the reaction mixture to 80° C. An initial addition of 5 cc. of dimethylaminoethanol was made followed thereafter by a regular feed of this substance of 89 g./hr. (100.5 cc./hr., 1 m./hr.). Flow of carbon monoxide was started at the rate of 14 g./hr. (0.5 m./hr.). Methylacetylene, carbon monoxide, dimethylaminoethanol feeds were increased at intervals until at 90 minutes the feed rates were as follows: methylacetylene, 2.62 m./hr. (105 g./hr.), carbon monoxide, 1.5 m./hr. (42 g./hr.), dimethylaminoethanol, 2.5 m./hr. (250 cc./hr., 222 g./hr). The above rates corresponded to a 60% carbon monoxide utilization, and the reaction temperature remained at 79–80° C. After 330 minutes, the nickel carbonyl supply was shut off. The carbon monoxide and catalytic methylacetylene feeds were shut off after 360 minutes. The stoichiometric reaction required another 10 minutes to consume the excess nickel carbonyl. The reaction mixture which overflowed during the reaction was recharged and methylacetylene introduced. At the end of another 20 minutes the reaction was completed and all feeds were shut down.

A total of 1880 g. representing an 80% yield, of dimethylaminoethyl methacrylate was isolated by fractional distillation of the reaction mixture in the presence of 11 g. of p-hydroxydiphenylamine. The product obtained had the following physical constants:

| | Found | Calc. |
|---|---|---|
| B.P., ° C | 70/10 mm. | |
| $n_D^{20}$ | 1.4395 | |
| Sap. No | 354 | 356 |
| ANN* | 354 | 356 |
| Br. No | 12.4 | 12.7 |

*ANN stands for "alkaline neutralization number."

Example 2

The reaction vessel, equipped with stirrer, thermometer, and cooling coil, was flushed out with nitrogen and charged with 200 cc. (173 g.) of toluene, and 42.5 cc. (43.0 g., 0.5 m.) of methacrylic acid. The carbonyl feeder was charged with 351 cc. (304 g.) of toluene and 99 cc. (128 g., 0.75 m.) of nickel carbonyl.

Reactant feeds were introduced as follows: Methylacetylene at the rate of (1.05 m./hr., 42 g./hr.), methacrylic acid 0.5 m./hr. (43 g./hr., 42.5 cc./hr.), and nickel carbonyl at 3 cc./min. After 10 minutes at the above feed rates the stoichiometric reaction was started by heating the reaction mixture to 80° C. After the start of the reaction, 5 cc. of dimethylaminoethanol (DMAE) was added to the reaction mixture and then fed to the reaction at 89 g./hr. (100.5 cc./hr., 1 m./hr.). After 15 minutes carbon monoxide gas was introduced at a feed rate of 0.5 m./hr. (14 g./hr.) and the feed rate of methylacetylene was increased to 1.58 m./hr. (63 g./hr.); these rates correspond to a 33% CO utilization, i.e., of the total carbon monoxide available for reaction, 33% was being supplied as gaseous carbon monoxide. The feed rates of carbon monoxide, methylacetylene, dimethylaminoethanol were increased at intervals of 10 minutes until at 55 minutes these rates were 1.22 m./hr. (34.2 g./hr.), 2.33 m./hr. (93.3 g./hr.), 2.22 m./hr. (222 cc./hr.) respectively, corresponding to a CO utilization of 55%. After 60 minutes the feed rate of methylacetylene was increased to 2.55 m./hr. (102 g./hr.), which corresponded to a 15% excess of methylacetylene based on the total available carbon monoxide. The temperature of the reaction was maintained at 79–87° C. by the use of cooling water. At 165 minutes the capacity of the reactor had been reached and the overflow was then collected. At 185 minutes the nickel carbonyl was shut off. The carbon monoxide gas and the catalytic portion of the methylacetylene was discontinued after 190 minutes. After 220 minutes an increasing vent gas rate indicated the cessation of gas absorption and the stoichiometric reaction ended. The reaction mixture collected in the overflow was then placed in the reactor and the remaining nickel carbonyl consumed at the stoichiometric level on feeding methylacetylene.

The reaction mixture was fractionally distilled and 870 g. (81% yield) of dimethylaminoethyl methacrylate was isolated. The product obtained had the following physical constants:

|  | Found | Calc. |
|---|---|---|
| B.P., ° C | 70/10 |  |
| $n_D^{20}$ | 1.4395 |  |
| Sap. No | 354 | 356 |
| ANN | 352 | 356 |
| Br. No | 12.5 | 12.7 |

Example 3

The reactor was swept with nitrogen and charged with 200 cc. (173 g.) of toluene and 42.5 cc. (43.0 g., 0.5 m.) of methacrylic acid. The nickel carbonyl feeder was charged with 99 cc. (128 g., 0.75 m.) of nickel carbonyl and 351 cc. (304 g.) of toluene.

The stirrer was started and methylacetylene was fed at the rate of 1.05 m./hr. (42 g./hr.), methacrylic acid at 0.5 m./hr. (42.5 cc./hr.), and the nickel carbonyl at 3 cc./min. The stoichiometric reaction was started after 10 minutes by heating the reaction mixture to 80° C. After fifteen minutes dimethylaminoethanol was fed to the reacting mixture at the rate of 89 g./hr. (100.5 cc./hr., 1 m./hr.). At the end of 30 minutes hydrogen chloride was introduced at the rate of 18.2 g./hr. (0.5 m./hr.). Methylacetylene, carbon monoxide, dimethylaminoethanol feeds were increased at intervals until at 105 minutes the feed rates were as follows: methylacetylene 2.1 m./hr. (84 g./hr.), carbon monoxide 1 m./hr. (28 g./hr.), dimethylaminoethanol, 2 m./hr. (178 g./hr.). The above rates corresponded to a 50% carbon monoxide utilization. The reaction temperature was kept at 85–90° C. At the end of 150 minutes the nickel carbonyl supply was shut off along with the carbon monoxide. The flow of methylacetylene was reduced to that required to give the stoichiometric part of the reaction. The stoichiometric reaction required another 30 minutes to use up the excess nickel carbonyl, after which all feeds were shut off.

A total of 516 g., representing a 70% yield, of dimethylaminoethyl methacrylate was isolated by fractional distillation of the reaction mixture. The product obtained had the following physical constants:

|  | Found | Calc. |
|---|---|---|
| B.P., ° C | 70/10 mm. |  |
| $n_D^{20}$ | 1.4395 |  |
| Sap. No | 354 | 356 |
| ANN | 354 | 356 |
| Br. No | 12.5 | 12.7 |

In a similar manner dibutylaminoethyl methacrylate was prepared. The product had the following physical constants:

B.P. _____ 101°/mm.
$n_D^{20}$ _____ 1.4474

In the same way there were used diethylaminoethanol to give diethylaminoethyl methacrylate, which boils at 84° C./7 mm.

Example 4

The reaction vessel, equipped with stirrer, thermometer, and cooling coil, was flushed with nitrogen and charged with 200 cc. (173 g.) of toluene, and 42.5 cc. (43.0 g., 0.5 m.) of methacrylic acid. The carbonyl feeder was charged with 351 cc. (304 g.) of toluene and 99 cc. (128 g., 0.75 m.) of nickel carbonyl. A second similar charge of nickel carbonyl was prepared.

Reactant feeds were introduced as follows: methylacetylene at the rate of 1.05 m./hr. (42 g./hr.), methacrylic acid at 0.6 m./hr. (51.6 g./hr., 43.4 cc./hr.), and nickel carbonyl at 2.5 cc./min. After 10 minutes at the above feed rates the stoichiometric reaction was started by heating the reaction to 80° C. After 15 minutes 1-dimethylamino-2-propanol was added to the reaction at the rate of 154 g./hr. (1.5 m./hr.) along with carbon monoxide at a rate of 0.5 m./hr., (14 g./hr.) and the methylacetylene was increased to 1.58 m./hr. (63 g./hr.). These rates correspond to a 33% CO utilization; i.e., of the total carbon monoxide available for reaction, 33% was being supplied as gaseous carbon monoxide. At the end of 45 minutes methacrylic acid was fed to the reaction at the rate of 3.6 cc. every 5 minutes. Methylacetylene, carbon monoxide, 1-dimethylamino-2-propanol feeds were increased at intervals until at 75 minutes the feed rates were as follows: methylacetylene 2.1 m./hr. (84 g./hr.), carbon monoxide 1 m./hr. (28 g./hr.), 1-dimethylamino-2-propanol 2 m./hr. (206 g./hr.) The above rates correspond to a 50% carbon monoxide utilization and the reaction temperature was kept at 85–90° C. After 180 minutes the nickel carbonyl feeder was empty and the second charge of nickel carbonyl was fed to the reaction. After 360 minutes the nickel carbonyl supply was shut off along with the carbon monoxide and the catalytic portion of the methylacetylene. The stoichiometric reaction required another 10 minutes to consume all of the nickel carbonyl, after which all feeds were shut down. The reaction mixture which overflowed during the reaction was treated with methylacetylene along with 0.25 m./hr. (21 cc.) of methacrylic acid. At the end of 20 minutes the reaction was completed and all feeds were shut down. The desired product was separated by distillation under reduced pressure.

A total of 975 g. of 1-dimethylamino-2-propyl methacrylate representing a 50% yield was isolated. The product had the following constants:

B.P. _____ 75–77° C./14 mm.
$n_D^{20}$ _____ 1.4345

Example 5

The above procedure carried out with N-phenyl-N-ethylaminoethanol, $C_6H_5(C_2H_5)NCH_2CH_2OH$, yields N-phenyl-N-ethylaminoethyl methacrylate. In this preparation the reaction temperature is maintained at 110° C. Methacrylic acid is used at 10% excess over that required by theory for reaction with the nickel carbonyl. The utilization of carbon monoxide is carried to 50% of the total carbonyl. The product distills at 117°–119° C./0.5 mm. and has a refractive index, $n_D^{20}$, of 1.5372.

In the same way N-benzyl-N-methylaminoethanol is reacted to give N-benzyl-N-methylaminoethyl methacrylate, distilling at 114° C./1 mm. and having a refractive index, $n_D^{20}$, of 1.5076.

Example 6

The above procedure carried out with morpholinoethanol yields morpholinoethyl methacrylate. The temperature of reaction held is held at about 80° C. Methacrylic acid is used at an excess of 10%. The utilization of carbon monoxide is 60% of the total carbonyl. The product distills at 81° C./1 mm.

In the same way 2-(2-pyridyl)ethanol is reacted to give 2(2-pyridyl)ethyl methacrylate, which distills at 72° C./1 mm. and has a refractive index, $n_D^{20}$, of 1.5097.

Example 7

The reactor was charged with 200 cc. (173 g.) of toluene and 28.6 cc. (30 g.) of acetic acid. The nickel carbonyl feeder was charged with a solution of 99 cc. of nickel carbonyl in 351 cc. of toluene. The flow of nickel carbonyl solution was started at the rate of 3 cc./min. The mixture was stirred and gradually heated while flows of α-butylacetylene, 1-hexyne, at 82 g./hr. (1 m./hr.) and of acetic acid at 30 g./hr. were started. Above 60° C. evidence of reaction was first noticed and the temperature of the mixture rose to 83° C., at about which level the reaction was thereafter maintained. Thereupon a feed of dimethylaminoethanol was started at 89 g./hr. (1 m./hr.). Reaction continued. Flow of carbon monoxide was started at 7 g./hr. and gradually increased as reaction proceeded. Over the course of about an hour rates of flow were adjusted with α-butylacetylene at 137 g./hr. (1.67 m./hr.), carbon monoxide at 18.7 g./hr., and dimethylaminoethanol at 156 g./hr. (1.75 m./hr.), the feed of acid remaining constant and the feed of nickel carbonyl solution being adjusted to 2.5 cc./hr. Reaction was continued until the charge of nickel carbonyl solution was consumed. At this point, feeds were discontinued for acid, nickel carbonyl, and carbon monoxide, while flow of dimethylaminoethanol was brought 89 g./hr. and the flow of 1-hexyne to 82 g./hr. until exothermic reaction ceased, when the process was terminated.

The reaction mixture was washed with water to remove nickel acetate and dimethylaminoethanol and acetate therefrom. The toluene solution was fractionally distilled. The desired product was taken off at 56°–58° C./0.07 mm. It corresponded by analysis to 2-(N,N-dimethylamino)ethyl α-butylacrylate. The following values were observed: refractive index, $n_D^{20}$, 1.4441, bromine number 9.85 (calculated 10.0 in terms of miliequivalents of bromine per gram of sample), and saponification number 279.5 (calculated 280.5).

Example 8

The procedure of Example 7 was followed with substitution of 1-dodecyne for the 1-hexyne of Example 7. Reactions proceeded in essentially the same way except temperature of reaction was maintained at 85–90° C.

The reaction mixture was worked up as above. The desired product, 2-(N,N-dimethylamino)ethyl α-decylacrylate, was distilled at 127° C./0.14 mm. Hg. It had a refractive index, $n_D^{20}$, of 1.4534, a bromine number of 6.9 (calculated 7.06), and a saponification number of 190.6 (calculated 198). The alkaline neutralization number found was 189 (calculated 198).

In the same way other α-substituted acetylenes can be reacted to give corresponding dimethylaminoethyl and other aminoalkyl esters of the various α-substituted acrylic acids. An interesting ester thus prepared was dimethylaminoethyl α-phenylacrylate or atropate. It should be noted that this compound requires the presence of a good polymerization inhibitor as it tends to polymerize readily. The boiling point of this ester was found to be 95° C./1.5 mm. Hg with $n_D^{20}$ of 1.5216. The infrared spectrum agreed with the above composition.

In place of the above dimethylaminoethanol there may be used any of the other aminoalkanols which have been described and used above.

The esters obtained are useful for preparing polymers, particularly copolymers in which a basic substituent is desired, as in coatings and oil additives. The esters also may be used as stabilizers for fuel oils, especially those containing cracked distillates.

In the isolation of the aminoalkyl α-substituted acrylates it is generally desirable to have present at least during the heating of the mixture for distillation a minor proportion of one or more polymerization inhibitors. In general the inhibitor may comprise from 0.01% to 10% of the mixture. Useful inhibitors include p-hydroxydiphenylamine, N,N'-diphenylphenylenediamine, di-β-naphtol, hydroquinone or its monomethyl ether, copper powder or an organic solvent-soluble copper salt, fumaronitrile, and other known types of polymerization inhibitors.

We claim:

1. A process for preparing α-substituted acrylic esters of aminoalkanols of the formula

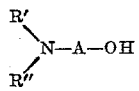

wherein A is an alkylene group of two to three carbon atoms between N and O and R' and R" when taken individually represent groups from the class consisting of alkyl, cycloalkyl, aralkyl, and phenyl groups of not over 12 carbon atoms each, and when taken together, a divalent saturated aliphatic chain from the class consisting of —$CH_2CH_2CH_2CH_2$—, —$CH_2CH_2CH_2CH_2CH_2$—, and —$CH_2CH_2OCH_2CH_2$—, which comprises (1) reacting together nickel carbonyl, a monocarboxylic acid from the class consisting of an acrylic acid, acetic acid, and propionic acid, and a monosubstituted acetylene from the class consisting of α-alkylacetylenes of not over 12 carbon atoms, α-benzylacetylene, α-cyclohexylacetylene, and α-phenylacetylene, (2) adding to a reacting mixture of the above compounds a said aminoalkanol and carbon monoxide, and (3) supplying to the reacting mixture and reacting together therein between 65° C. ad 125° C. (a) nickel carbonyl, (b) an acid from the class consisting of an acrylic acid, acetic acid, propionic acid, and hydrochloric acid, (c) a said monosubstituted acetylene, (d) a said aminoalkanol, and (e) carbon monoxide.

2. A process for preparing α-substituted acrylic esters of aminoalkanols of the formula

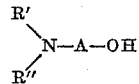

wherein A is an alkylene group of two to three carbon atoms between N and O and R' and R" when taken individually represent groups from the class consisting of alkyl, cycloalkyl, aralkyl, and phenyl groups of not over 12 carbon atoms each, and when taken together, a divalent saturated aliphatic chain from the class consisting of —CH$_2$CH$_2$CH$_2$CH$_2$—, —CH$_2$CH$_2$CH$_2$CH$_2$CH$_2$—, and —CH$_2$CH$_2$OCH$_2$CH$_2$—, which comprises (1) reacting together between 65° C. and 125° C. nickel carbonyl, a monocarboxylic acid from the class consisting of an acrylic acid, acetic acid, and propionic acid, and a monosubstituted acetylene from the class consisting of α-alkylacetylenes of not over 12 carbon atoms, α-benzylacetylene, α-cyclohexylacetylene, and α-phenylacetylene, (2) adding to a reacting mixture of the above compounds a said aminoalkanol and carbon monoxide, and (3) supplying to the reacting mixture and reacting together therein between 65° C. and 125° C. nickel carbonyl, said acid, α-substituted acetylene, said aminoalkanol, and carbon monoxide.

3. A reaction according to claim 2 in which in supplying nickel carbonyl, said acid, said α-substituted acetylene, said aminoalkanol and carbon monoxide the last named substance provides between 30% and 70% of the total carbonyl entering into reaction.

4. The process of claim 3 in which the reactions are carried out between 75° and 115° C.

5. A process for preparing dimethylaminoethyl methacrylate, which comprises (1) reacting together nickel carbonyl, methacrylic acid, and methylacetylene, (2) adding to the reacting mixture dimethylaminoethanol and carbon monoxide, and (3) supplying to the reaction mixture and reacting together therein between 65° and 125° C. nickel carbonyl, methacrylic acid, methylacetylene, dimethylaminoethanol, and carbon monoxide, the carbon monoxide supplying between 30% and 70% of the total carbonyl entering into reaction.

6. A process for preparing 1-(N,N-dimethylamino)-2-propyl methacrylate which comprises (1) reacting together nickel carbonyl, methacrylic acid, and methylacetylene, (2) adding to the reacting mixture 1-(N,N-dimethylamino)-2-propanol and carbon monoxide, and (3) supplying to the reacting mixture and reacting together therein between 65° C. and 125° C. the nickel carbonyl, methacrylic acid, methylacetylene, 1 - (N,N-dimethylamino)-2-propanol, and carbon monoxide, the carbon monoxide supplying between 30% and 70% of the total carbon entering into reaction.

7. A process for preparing morpholinoethyl methacrylate which comprises (1) reacting together between 65° and 125° C. nickel carbonyl, methacrylic acid and methylacetylene, (2) adding to the reacting mixture 2-morpholinoethanol and carbon monoxide and (3) supplying to the reacting mixture and reacting together therein between 65° C. and 125° C. nickel carbonyl, methacrylic acid, methylacetylene, 2-morpholinoethanol, and carbon monoxide, the carbon monoxide supplying between 30% and 70% of the total carbonyl entering into reaction.

8. A process for preparing 2-(N,N-dimethylamino)-ethyl α-butyl acrylate which comprises (1) reacting together between 65° C. and 125° C. nickel carbonyl, acetic acid and 1-hexyne, (2) adding to the reacting mixture dimethylaminoethanol and carbon monoxide, and (3) supplying to the reacting mixture and reacting together therein between 65° and 125° C. nickel carbonyl, acetic acid, 1-hexyne, dimethylaminoethanol and carbon monoxide, the carbon monoxide supplying between 30% and 70% of the total carbonyl entering into reaction.

9. A process for preparing 2-(N,N-dimethylamino)-ethyl α-decyl acrylate which comprises (1) reacting together between 65° and 125° C. nickel carbonyl, acetic acid, and 1-dodecyne, (2) adding to the reacting mixture dimethylaminoethanol and carbon monoxide, and (3) supplying to the reacting mixture and reacting together therein between 65° and 125° C. nickel carbonyl, acetic acid, 1 dodecyne, dimethylaminoethanol and carbon monoxide, the carbon monoxide supplying between 30% and 70% of the total carbon monoxide entering into reaction.

References Cited in the file of this patent
UNITED STATES PATENTS
2,888,480   Neher et al. _____ May 26, 1959